United States Patent [19]

Ofenloch

[11] Patent Number: 4,599,158

[45] Date of Patent: Jul. 8, 1986

[54] CIRCULAR COIL ELECTROLYSIS APPARATUS

[76] Inventor: Bernard G. F. Ofenloch, 14101 Doty Ave. #19, Hawthorne, Calif. 90250-9998

[21] Appl. No.: 717,833

[22] Filed: Mar. 29, 1985

[51] Int. Cl.⁴ .................... C25B 15/08; C25B 9/00
[52] U.S. Cl. .................... 204/228; 204/270; 204/272; 204/278; 204/DIG. 009
[58] Field of Search ........ 204/272, 278, 228, DIG. 9, 204/270

[56] References Cited

U.S. PATENT DOCUMENTS 3,990,962 11/1976 Götz .................... 204/272 X
4,113,601 9/1978 Spirig .................... 204/272 X
4,379,043 4/1983 Chappelle .................... 204/270 X Primary Examiner—Donald R. Valentine

[57] ABSTRACT

This disclosure relates to a simple electrolysis apparatus utilizing no physical electrical connecting means to an array of electrodes. The apparatus comprises an array of electrode plates aligned radially from the axis of symmetry, a container housing the electrode plates or cells, a coil of wire around the periphery of the container and means to provide an appropriate variation in the coil current conducive to the occurrence of the electrolysis process between the electrode plates.

11 Claims, 3 Drawing Figures

CIRCULAR COIL ELECTROLYSIS APPARATUS

BACKGROUND OF THE INVENTION

1. Field of the Invention

This device relates to an alternate and novel approach to the production of gases by electrolysis. One unique and important feature is that no direct physical electrical connection from the power source to the electrodes is needed.

2. Description of the Theory

The production of gases in the electrolysis process is most easily affected by placing two non-corroding electrodes in a diluted electrolytic solution (aqueous potassium hydroxide for example) and then applying a potential between the electrodes. In the electrolysis of water a substantial amount of electrical energy is required to obtain an appreciable amount of gases. There are several factors that can influence the rate of production of gases at the electrodes. If one were to consider the electrolysis of water, for example, one could increase the potential between the electrodes, as long as the resistance remained constant. There is one pound of hydrogen produced per 12,060 ampere-hours. For solutions at 25° C., 1.229 Volts is the minimum theoretical energy requirement that can be measured as an applied voltage (giving 14.9 KWH per pound of hydrogen). A perfect cell would operate at this voltage and energy input but would require an additional input of thermal energy equivalent to another 3.1 KWH per pound of hydrogen. In order to provide all the necessary energy as electrical energy, the corresponding voltage is 1.483 Volts (for 18.0 KWH per pound). Another method to increase the rate of production of the gases would be to heat the electrolytic solution while maintaining the required potential between the electrodes.

To increase the rate of production of gases one could also increase the conductivity of the solution in order for the ions in solution to move more freely between the electrodes. One could also increase production by increasing the surface area of the electrodes.

A method of increasing the movement of the ions to the anode and cathode by inducing more of a potential between the electrodes will be examined. The ion movement could be increased by the introduction of an oscillating magnetic field. This would induce an electromotance as is shown by one of Maxwell's equations:

$$E = -d/dt \int B \cdot da,$$

where E is the induced electromotance, B is the magnetic field vector and da is the differential area element vector.

A design to utilize this principle would be to employ a cylindrical circular coil or solenoid. An oscillating current in the coil wire would cause the magnetic field around the coil or solenoid to oscillate also. The design of this invention will only be concerned with the fields inside the coil.

In the plane of the individual current loops, a circular oscillating electric field is induced in this case. One takes advantage of this induced electric field by placing cells of electrodes along the direction of the magnetic field perpendicular. The existing electromotance will cause a movement of the ions in the electrolytic solution to the respective anode and cathode of the cells. The magnitude of the electromotance will be proportional to the product of the magnitude of the coil current, the number of turns of the coil, the radius of the coil loops and frequency of the coil current.

Thus, by varying any of the mentioned parameters one can vary the amount of product produced. One would also consider the relation for the current in an inductor with respect to the current frequency. It must also be considered if any type of waveform of the current could be utilized. It turns out that the waveform to be used must be of an unsymmetric and rectified form (unsymmetric with respect to ½ the period).

The movement of the ions will also be influenced by the magnetic field from the current in the coil. The force experienced by the ions in the solution will be toward the center of the apparatus. This is accomplished by correctly choosing the direction of the current in the coil wire. The net motion of the ions, if no electrodes were present, would be a spiralling toward the center of the apparatus.

In conclusion, one would have a fairly simple electrolysis apparatus with the only electrical connection being that to the coil. If desired, one could also connect the electrodes to the power supply to supplement the electromotance between the electrodes due to the oscillating magnetic field. Also, there is no motion of any part of the apparatus to be concerned with. Depending upon the electrode or coil size desired, the fields between the electrodes could be considered fairly uniform.

SUMMARY OF THE INVENTION

This invention relates to a fairly simple and improved apparatus for the production of gases by electrolysis. One embodiment of the invention could be the electrolysis of water.

An object of this invention is to provide a means to produce gases by electrolysis which could utilize a large aggregate surface area.

It is also an object of this invention whereby one has a number of electrolysis cells in the apparatus without a direct connection to a power supply implementing wires or other such physical electrical connections.

This invention for an electrolysis apparatus provides a means whereby the rate of production of the gases can be controlled or affected in a variety of ways commensurate with the particular application desired.

This invention for an electrolysis apparatus could be arranged with other apparatuses of the type of this invention to facilitate an increased production of the gases by utilizing a larger aggregate electrode surface area.

Figure 1:
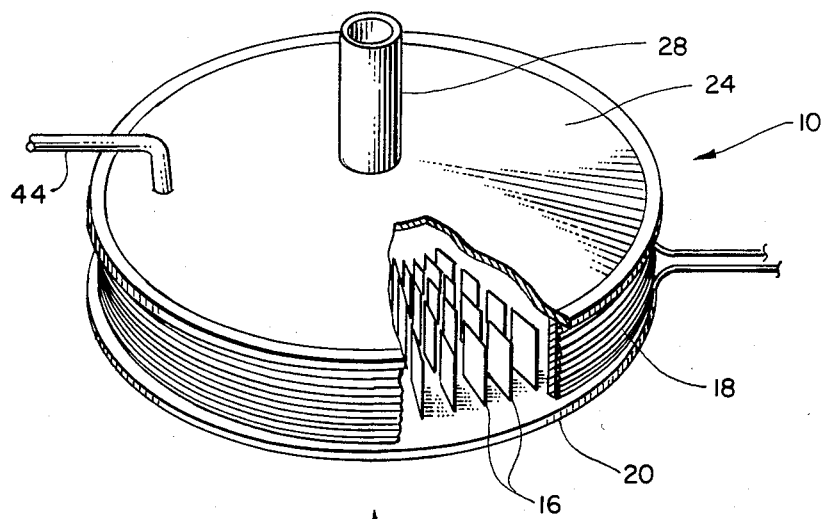
FIG. 1 is a perspective view of a singular unit of the electrolysis apparatus.

Referring to FIG. 1, an electrolysis unit is generally designated reference number 10 with a section cut away to reveal the non-corroding electrode plates 16 arranged within in a circular pattern at various radii from the axis of symmetry. The electrodes 16 are placed in slots or attached using some method of bonding to the electrically non-conducting base of the container 20. The coil of wire 18 is wound or placed around the periphery of the electrically non-conducting container 20 with the desired number of turns. The container 20 may or may not be of one piece and should also have the property of being magnetically permeable.

A shallow cone-type cover 24 for the electrolysis apparatus unit 10, also composed of a non-corroding material, is attached to the unit cover 24 to direct the gases to a tube or pipe 28 to where they are desired. The gas flow away from the interior of the apparatus 10 is illustrated by the arrows directed to the central tube 28. The cover 24 should be attached to the electrolysis apparatus 10 in a manner so that it could be easily removed for periodic inspection of the interior of the apparatus. A tube or pipe 44 would be utilized to direct the flow of water or electrolytic fluid through the cover 24 to the interior of the apparatus 10.

Figure 2:
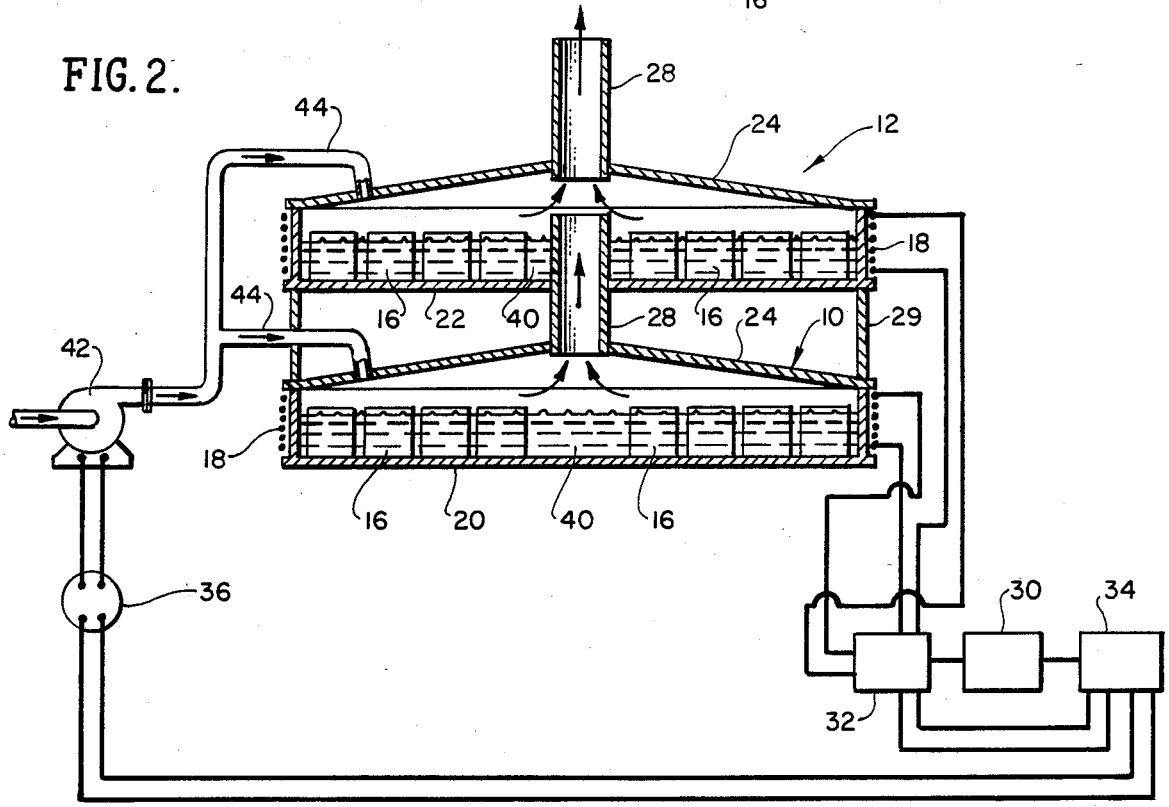
FIG. 2 is a sectional view showing several electrolysis units arranged one on top of the other with exhaust tubes allowing the gases produced to exit in an upward direction.

FIG. 2 illustrates an embodiment where the electrolysis unit of type 12 is mounted above the unit of type 10. Other embodiments could be imagined whereby several units of type 12 could be mounted above the apparatus 10. Tubes or pipes 28 would be placed along the axis of symmetry of these apparatuses 10 and 12 with the gases exiting upward as directed by the arrows through these centrally placed tubes 28. The arrangement of these units 10 and 12 would be supported by means of the supports 29 placed or attached near the periphery of and between the two apparatuses 10 and 12. The means to make the arrangement of units 10 and 12 function are also depicted.

The oscillating, unsymmetric and rectified wave form of the current to the electrolysis apparatuses 10 and 12 would originate from the waveform generator 30. The output current from the waveform generator 30 could be amplified by means of an amplifier 32. The amplification unit 32 would have a means to vary the current to the coils 18 of the units 10 and 12 and could be one of several types commercially available depending upon one's particular application. The waveform generator 30 would draw its power from a power supply 34 as would the amplifier 32 also, which, depending upon the type of waveform generator 30 or amplifer 32 used, could be of a direct or alternating current variety.

As the electrolytic fluid 40 is depleted, a pumping means 42 would be implemented to insure a continuing supply of the fluid 40 to the units 10 and 12. The pumping means 42 could be of any type currently available for commercial or domestic use. The arrows from the pump 42 illustrate the direction of fluid flow. For an electrical pumping means 42, a potentiometer 36 or other means to regulate current flow to the pump 42 would be implemented to regulate the rate of flow of the electrolytic fluid 40 from the pump to the electrolysis apparatuses 10 and 12. The potentiometer 36 may be implemented in conjunction with the frequency control of the waveform generator 30 so that the frequency of the current is increased and the flow of the fluid 40 to the units 10 and 12 is also increased. The potentiometer 36 may also be implemented in conjunction with the output control of the amplifier 32 so that as the output current is increased, the amount of gases produced is increased and the current to the pumping means 42 is increased thereby increasing the rate of flow to the apparatuses 10 and 12. If the arrangement of the units 10 and 12 is to be used for an internal combustion type engine, the pumping means 42 could be of a mechanical type where it would derive its power through the use of a pulley system.

Figure 3:
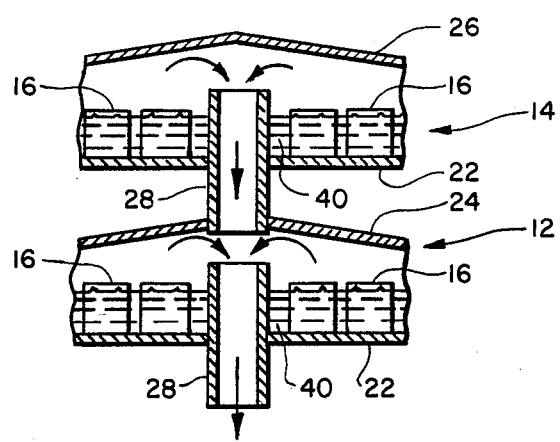
FIG. 3 is a partial sectional view showing several apparatuses arranged one on top of the other with the gases produced exiting in a downward direction.

FIG. 3 illustrates an embodiment in which the electrolysis apparatuses 12 and 14 could be arranged in order to have the gases produced exit through the pipes 28 in a downward direction as indicated be the arrows. The pipes 28 are inserted through the container base 22 of unit 14. The cover 26 would be closed at its apex and the covers for the lower unit 12 would be those numbered 24 as is also indicated in FIGS. 1 and 2.

DESCRIPTION OF THE PRIOR ART

U.S. Pat. No. 3,954,592 issued to S. Horvath on May 4, 1976 for an Electrolysis Apparatus teaches a method and apparatus for the production of hydrogen and oxygen gas. The current for carrying on the electrolysis process is provided by a transformer inside the anode and the pulsing of the electrode cathode at a rapid rate increases the current available for the electrolysis process.

The invention for an electrolysis apparatus that this patent application is concerned with has no direct electrical contact with the electrodes nor any direct use of a transformer other than may be existing in the particular type of amplifier of the current from the waveform generator employed. The apparatus of S. Horvath is also a rather complicted device where complicated machining procedures would have to be employed. His apparatus also utilizes rather high electrical currents which could be potentially dangerous if the user did not exercise utmost caution. The Circular Coil Electrolyis Apparatus is a much simpler device and not dangerous as everything is housed in a container. The signal amplifier could be of any type currently available to industry as well as the general public. One would also have access to any type of wave or signal generator, with equal ease of availability as well of the pumping means and potentiometer. The current in the Circular Coil Electrolysis Apparatus is not pulsed but varies according to an oscillating and non-symmetric waveform and the voltage is that of the power source and thus is as stable as that particular source of power. The current used need not be direct but could also be alternating if desired.

U.S. Pat. No. 3,522,162 issued to R. L. Davies on July 28, 1970 on Electrolytic Reactions Under the Influence of Magnetic Field also teaches a method and apparatus to cause the migration of ions or electrically charged particles in a solution by passing a body of solution through and cutting a magnetic field. The invention uses a sawtooth current generator to generate a pulse wave form which is applied to effect a magnetic field to cause motion of the ions mainly in one direction.

Although this apparatus utilizes a magnetic field, the Circular Coil Electrolysis Apparatus does no require the motion of any part of the apparatus. Thus, one need not be concerned with the wearing out of bearings and bushings with time and use. The magnetic field is generated by utilizing a pair of electromagnets whereas with the Circular Coil Electrolysis Apparatus (CCEA) a current through one coil suffices. Again, this device would also require rather involved machining and assembly procedures not at all necessary with the CCEA. This device also has a physical electrical connection with the power source which is not necessary with the CCEA.

U.S. Pat. No. 4,184,391 issued to K. Inoue on Jan. 22, 1980 on a Method of Electrolytically Generating Hydrogen and Oxygen For Use In A Torch or the Like. This patent teaches a pulse wave form for alternately connecting and disconnecting the direct current across the electrodes so as to pass a pulsed electrolyzing current between the electrodes with adjusted pulse duration and interval.

This device uses cylindrically shaped electrodes connected to a pulsing wave supply. CCEA utilizes plate electrodes not connected to a power supply and does not need a pulsed waveform with a limited range of operation as is indicated in the patent.

U.S. Pat. No. 4,297,184 issued to C. K. Dyer on Oct. 27, 1981 for a Method of Etching Aluminum teaches the use of uneven waveforms in the electrolytic etching of aluminum foil.

The waveform for the just mentioned invention can be used in the CCEA upon rectification but is not restricted to using just those waveforms. As was indicated in the "Background of the Invention" section, any rectified waveform that is unsymmetric with respect to half its period could be used. The time to rise to the peak current must not equal the time to fall to zero current and is the only rquirement for the coil current in the CCEA.

U.S. Pat. No. 4,105,528 issued to S. Hasebe, et al. on Aug. 8, 1978 for an Apparatus for Decomposition of Aqueous Liquid teaches an apparatus for decomposition of liquid in which negative and positive electrodes are arranged in a closed relation and the electrolyte is placed to flow between the negative and positive electrodes under the function of a potential magnetic field formed by the coil current generated by the electrodes from the active movement of an electrolytic ion so that the electrolysis of water takes place smoothly.

The electrodes are arranged in a rather complicated fashion and are directly connected to a power supply with the magnetic field derived from the coil shape of the electrodes and permanent magnets located above and below the coiled electrodes. Again, the CCEA uses no permanent magnets and no direct physical connection between the electrodes and the power source.

U.S. Pat. No. 3,969,214 issued to Mack Harris on July 13, 1976 for a Permanent Magnet Hydrogen Oxygen Generating Cells. This patent teaches a generating coil for hydrogen and oxygen utilizing permanent magnets and electromagnets. Means are provided for removing gases from the electrodes and mixing chambers are provided for water and the electrolyte used in the cell.

This patent utilizes permanent magnets and electromagnets to give rise to the magnetic field and is also a rather complicated device which would necessitate involved machining and assembly processes. This patent also has its electrodes directly attached, by wire means, to the power supply. This device utilizes sulfuric acid ($H_2SO_4$) which could be potentially dangerous when not handled with appropriate caution. A burner to heat the $H_2SO_4$ and water is used which is not at all required in the CCEA. The motion of several parts of this apparatus is necessary which would cause one to be concerned with wear and fatigue of the device.

A feature of the CCEA that is rather unique and very practical as opposed to the devices of the prior art is that many of the apparatuses could be arranged one on top of the other in order to increase the surface area for the electrolysis process and thus increase the production of gases.

The features mentioned here, in the "Summary of the Invention" and in the "Specifications" clearly indicate the simplicity and practicality of the apparatus and thus it could have a wide variety of embodiments as opposed to the other apparatuses. One embodiment of this apparatus could be in the operation of internal combustion type engines. In this instance, the power source could be the direct current battery that is currently used in automobiles. The battery could be recharged to some extent by an alternator or generator as well as some turbine type device that would be driven by the exhaust gases. It is conceded that these methods of recharging would probably not be sufficient but the price of recharging the battery using a "trickle type" charging device on the battery when the CCEA is not in use and the convenience of utilizing water would be rather small compared to the rising costs and dangers of hydrocarbon based fuels. This CCEA would also be quite safe for use as only that amount of gases produced would be immediately utilized in an internal combustion engine which would also negate the need to store the hydrogen and oxygen gases. The only substance to be stored until use would be the water itself. Also, one has no need for concern of environmental damage as the only byproduct of the combustion process would be water. Another use of this apparatus would be in the desalinisation of sea water. In this application, on any scale, one would supply the initial power to electrolyse the sea water and then combine the hydrogen and oxygen gases utilizing an internal combustion engine or other means. The power thus generated from the combustion of the gases could be used to assist or augment the power input to one or more of the CCEAs.

For this apparatus the use of a circular coil is not necessary as one could also implement ellipsoidal, rectangular, etc. designs also.

In conclusion then, one has a simple apparatus for the process of electrolysis with the features of varying the production of the gases in a variety of manners. These capabilities then render the CCEA far more advantageous and desirable than the other prior art apparatuses for almost any application it could be utilized for.

What is claimed is:

1. An electrolysis apparatus for the production of gases from an electrolytic type fluid comprising, in combination:

electrode plates arranged in a circular fan-type array at varying distances from the center of the apparatus such that the plane of each electrode plate is perpendicular to the plane of an imaginary circular disk centered on the axis of symmetry of the array;

a containing means for housing the electrode plate array;

a coil of wire is placed about the periphery of said containing means or the electrode plate array.

2. An electrolysis apparatus in accordance with claim 1 utilizing no direct physical electrical conducting means to the electrode plates.

3. An electrolysis apparatus in accordance with claim 2 whereby said containing means comprises a covering means to direct the gases produced away from the apparatus.

4. An electrolysis apparatus commensurate with claim 2 comprising a feature whereby the electrolysis apparatus is arranged in conjunction with other like apparatuses utilizing a means to conduct the gases produced by electrolysis along a common axis of symmetry through the base of each apparatus; and the lowest or beginning apparatus will possess no conducting means, for the gases produced, through its base.

5. An electrolysis apparatus comensurate with claim 2 comprising a feature whereby the electrolysis apparatus is arranged in conjunction with other like apparatuses utilizing a means to conduct the gases produced by electrolysis along a common axis of symmetry through the base of each apparatus; and the uppermost or beginning apparatus will possess no conducting means, for the gases produced, through its covering means.

6. A container for an electrolysis apparatus in accordance with claim 2, comprises a cover with removeable means for the periodic inspection of the apparatus interior.

7. An electrolysis apparatus in accordance with claim 1 or claim 2 whereby said containing means is of a non-corroding, magnetically permeable and electrically insulating type material.

8. An electrolysis apparatus according to claim 7 that utilizes a means to provide a continuing flow of electrolytic fluid or water to the apparatus whereby the fluid flow can be varied as desired.

9. An electrolysis apparatus in accordance with claim 1 whereby a current is passed through the coil wire which will vary periodically and have an unsymmetric and rectified type waveform with respect to a representative period.

10. An electrolysis apparatus in accordance with claim 9 whereby a means to amplify the waveform power is implemented.

11. An electrolysis apparatus in accordance with claim 1 utilizing a means whereby the electrical current in the coil and the frequency of the waveform implemented can be varied.

* * * * *